United States Patent [19]
Hayashi

[11] Patent Number: 5,323,471
[45] Date of Patent: Jun. 21, 1994

[54] PATTERN RECOGNITION APPARATUS AND PATTERN LEARNING APPARATUS EMPLOYING NEURAL NET INCLUDING EXCITATORY ELEMENT-INHIBITORY ELEMENT PAIR COUPLINGS

[75] Inventor: Yukio Hayashi, Kyoto, Japan

[73] Assignee: ATR Auditory and Visual Perception Research Laboratories, Kyoto, Japan

[21] Appl. No.: 859,795

[22] Filed: Mar. 30, 1992

[30] Foreign Application Priority Data

Sep. 12, 1991 [JP] Japan .................... 3-232881

[51] Int. Cl.$^5$ .................................. G06K 9/00
[52] U.S. Cl. .............................. 382/15; 395/24
[58] Field of Search ............... 382/14, 15; 395/21, 395/24, 23

[56] References Cited

U.S. PATENT DOCUMENTS

5,060,278 10/1991 Fukumizu .................... 382/14
5,259,065 11/1993 Takatori et al. .............. 395/21

FOREIGN PATENT DOCUMENTS

0245508 11/1987 European Pat. Off. .

OTHER PUBLICATIONS

K. Fukushima et al. "Handwritten Alphanumeric Character Recogniton by the Neocognitron", IEEE Transaction on Neural Networks, vol. 2, No. 3, May 1991, pp. 355-365.
"Nonlinear Dynamics of Pattern Formation and Pattern Recognition in the Rabbit Olfactory Bulb", B. Baird, Physica 22D (1986) pp. 150-175.
"A Learning Algorithm to Teach Spatiotemporal Patterns to Recurrent Neural Networks", M. Sato, Biol. Cybern. 62, pp. 259-263 (1990).
"Approximation of Nonlinear Dynamics by Recurrent Network and Learning Chaos", Y. Murakami et al., NC90-81, pp. 77-82 (no date).
"A Recurrent Network Which Learns Chaotic Dynamics", Yoshihiko Murakami et al., ACNN'91, pp. 1-4 (1991.2).
"APOLONN Brings Us to the Real World: Learning Nonlinear Dynamics and Fluctuations in Nature", Masaaki Sato et al., IJCNN 90 at San Diego vol. 1, pp. 581-587 (1990.6).

*Primary Examiner*—Leo H. Boudreau
*Attorney, Agent, or Firm*—Lowe, Price, LeBlanc & Becker

[57] ABSTRACT

Disclosed in a pattern recognition apparatus including a neural net including a plurality of mutually coupled excitatory element-inhibitory element paris. The elements in the neural net are coupled through pair coupling coefficients and an excitatory element coupling coefficient. A teacher signal generator outputs a successive teacher signal Q (t) and its infinitesimal variation ΔQ (t) in accordance with a learning pattern, to apply the output teacher signal and the output small variation to a coupling coefficient controller. The coupling coefficient controller carries out a learning processing in accordance with the teacher signal, so that the coupling coefficients in the neural net are updated. An operation time necessary for a pattern recognition is shortened. In addition, since the learning processing is carried out by only a forward processing on time base, a learning time is also decrease.

14 Claims, 13 Drawing Sheets

PATTERN RECOGNITION APPARATUS AND PATTERN LEARNING APPARATUS EMPLOYING NEURAL NET INCLUDING EXCITATORY ELEMENT-INHIBITORY ELEMENT PAIR COUPLINGS

BACKGROUND OF THE INVENTION

1. Field of the Invention

The present invention relates generally to pattern recognition apparatus and pattern learning apparatus and, more particularly, to a pattern recognition apparatus and a pattern learning apparatus employing a neural net including a plurality of excitatory element-inhibitory element pairs. The invention has a particular applicability to a character recognition apparatus.

2. Description of the Background Art

Conventionally, a pattern recognition technology for recognizing image patterns, character or symbol patterns and speech patterns has been known, and recognition apparatus for recognizing those patterns have been developed. A conventional pattern recognition apparatus compares an applied input pattern with a dictionary pattern stored in advance and then detects the distance (for example, "Euclidean distance") or the similarity between the input pattern and the dictionary pattern, thereby determining classification of the applied input pattern. In general, however, characters, speech and the like which are used in practice by human beings are varied even in one classification. Pattern recognition technology in which recognition can be made in accordance with a dictionary pattern without being affected by the variations of characters and speech has not yet been developed.

It is reported that there occurs a significantly dynamic chaotic oscillation phenomenon represented such as by electroencephalogram (or EEG) in brains of creatures, especially of higher-level creatures such as human beings. It seems that a different processing from a recognition processing employing a conventional dictionary pattern is carried out in the brains of higher-level creatures.

In general, it is reported that when recognizing the same kinds of objects or concepts which are individually different and varied though, such higher-level creatures as human beings detect an invariable amount or invariance of the objects or the concepts which is not affected by such variation, and also detect continuity of the variation, thereby recognizing the objects or the concepts. In cognitive psychology, for example, it is reported that a continuous internal operation called "mental rotation" is present in the brains.

Further, it is reported that there occurs oscillation in a neural net including a plurality of mutually coupled excitatory element-inhibitory element pairs as a recognition model. This is described in the article by B. Baird entitled "Nonlinear Dynamics of Pattern Formation and Pattern Recognition in the Rabbit Olfactory Bulb," *Physica*, Vol. 22D, pp. 150–175, 1986.

In addition, a discovery that a learning of a continuously transformed pattern such as a time-series pattern is available in principle which continuously varies on time base is described in the article by M. Sato entitled "A Learning Algorithm to Teach Spatiotemporal Patterns to Recurrent Neural Networks," *Biological Cybernetics*, pp. 259–263, 1990. Moreover, another discovery that a lower-dimensional chaotic orbit called "Lorenz Attractor" is also obtained by employing the learning rules of the recurrent networks by M. Sato is also reported in the article entitled "A Learning of Approximation and Chaos of Nonlinear Dynamics by Recurrent Networks," *IEICE Technical Report* NC90-81, pp. 77–82, 1991. However, those articles have not yet reported that a dynamic orbit is obtained by employing a large number of practical patterns such as images and speech.

For recognizing an input pattern having a great variation such as characters or letters written by human beings, for example, no accurate classification is often made in a recognition method based on a detected correlation distance or similarity. However, it is considered that human beings generally recognize various transformation patterns by a continuous internal operation. Problems of the conventional method based on detection of correlation distances may be solved by employing such a continuous internal operation.

It is pointed out, however, that for realizing the continuous transformation by an oscillation of the neural net, it is difficult to analytically obtain oscillation conditions in the conventional neural net including a plurality of mutually coupled excitatory element-inhibitory element pairs. In addition, since all elements are completely coupled to one another via a number of multipliers in the neural net, a vast amount of calculation cannot be avoided. When a continuous transformation pattern that varies continuously is learned by a neural net, the calculation amount of a temporal inverse processing corresponding to a back propagation of a feedforward net, i.e., a processing that advances backward on time base becomes enormous, resulting in a need for a longer learning time.

SUMMARY OF THE INVENTION

One object of the present invention is to reduce an operation time necessary for pattern recognition in a pattern recognition apparatus employing a neural net including a plurality of mutually coupled excitatory element-inhibitory element pairs.

Another object of the present invention is to reduce a necessary learning time in a pattern learning apparatus employing a neural net including a plurality of mutually coupled excitatory element-inhibitory element pairs.

A pattern recognition apparatus in accordance with the present invention includes a neural net including a plurality of excitatory element-inhibitory element pairs, each being mutually coupled in accordance with a predetermined relation. Each element pair has its corresponding excitatory element and its corresponding inhibitory element connected with each other in opposite directions, respectively, through a first pair coupling coefficient for excitatory coupling and a second pair coupling coefficient for inhibitory coupling. A plurality of excitatory elements receive a plurality of input signals for defining input patterns, respectively. Any two of the excitatory elements are coupled in opposite directions through an excitatory element coupling coefficient. The pattern recognition apparatus further includes a teacher signal generating unit for generating a teacher signal in accordance with a learning pattern to be learned, and a coupling coefficient updating unit responsive to a teacher signal for updating the first and second pair coupling coefficients and the excitatory element coupling coefficients in the neural net. After updating by the coupling coefficient updating unit, the neural net receives a plurality of input signals and outputs activating signals through the plurality of excitatory elements. The pattern recognition apparatus further includes a classification determining unit responsive to the activating signals for determining classification of input patterns.

In operation, the plurality of excitatory element-inhibitory element pairs that are mutually coupled in the neural net are simplified to be coupled through the first and second pair coupling coefficients and the excitatory element coupling coefficients. Thus, the amount of operation necessary for updating of coupling coefficients by the coupling coefficient updating unit is decreased, resulting in a reduction in operation time necessary for pattern recognition.

According to one aspect, a pattern learning apparatus in accordance with the present invention includes a neural net including a plurality of excitatory element-inhibitory element pairs each mutually coupled in accordance with a predetermined relation. Each element pair has its corresponding excitatory element and its corresponding inhibitory element coupled in opposite directions, respectively, through first and second pair coupling coefficients. Two elements of a excitatory element and the corresponding inhibitory element are coupled in opposite directions respectively through an excitatory element coupling coefficient and an inhibitory element coupling coefficient. The pattern learning apparatus further includes a teacher signal generating unit for generating a teacher signal in accordance with a learning pattern to be learned, and a forward-time learning processing unit for updating the second pair coupling coefficients and the excitatory element coupling coefficients in the neural net by executing only a forward processing on time base with respect to a teacher signal.

In operation, the amount of operation necessary for updating coupling coefficients in the neural net is decreased. In addition, since the forward-time learning processing unit can update coupling coefficients in the neural net by executing only the forward processing on time base with respect to a teacher signal, a backward processing on time base is unnecessary. In other words, an efficient learning can be made and a learning time is reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
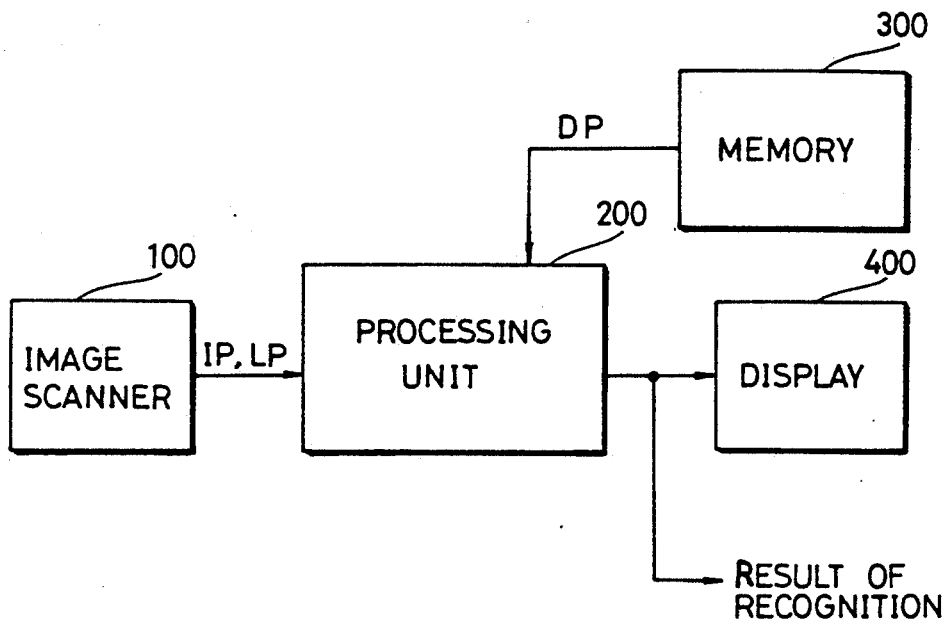
FIG. 2 is a block diagram of a pattern recognition apparatus showing one embodiment of the present invention.

FIG. 2 is a block diagram of a pattern recognition apparatus showing one embodiment of the present invention. The invention is applicable generally to recognition of patterns such as image patterns, character or symbol patterns and speech patterns. A description will now be made on, as one example, such an example that the invention is applied to a pattern recognition apparatus for character recognition.

With reference to FIG. 2, the pattern recognition apparatus includes an image scanner 100 for reading characters on an original, a processing unit 200, a memory device 300 and a display device 400. An input pattern IP to be recognized and a learning pattern LP for use in a learning processing are applied from image scanner 100 to processing unit 200. Data as to a dictionary pattern is stored in advance in memory device 300. Stored data DP is applied to processing unit 200. Data indicating the result of recognition is applied to display device 400 to be displayed on a CRT not shown and also applied to other devices not shown.

Figure 1:
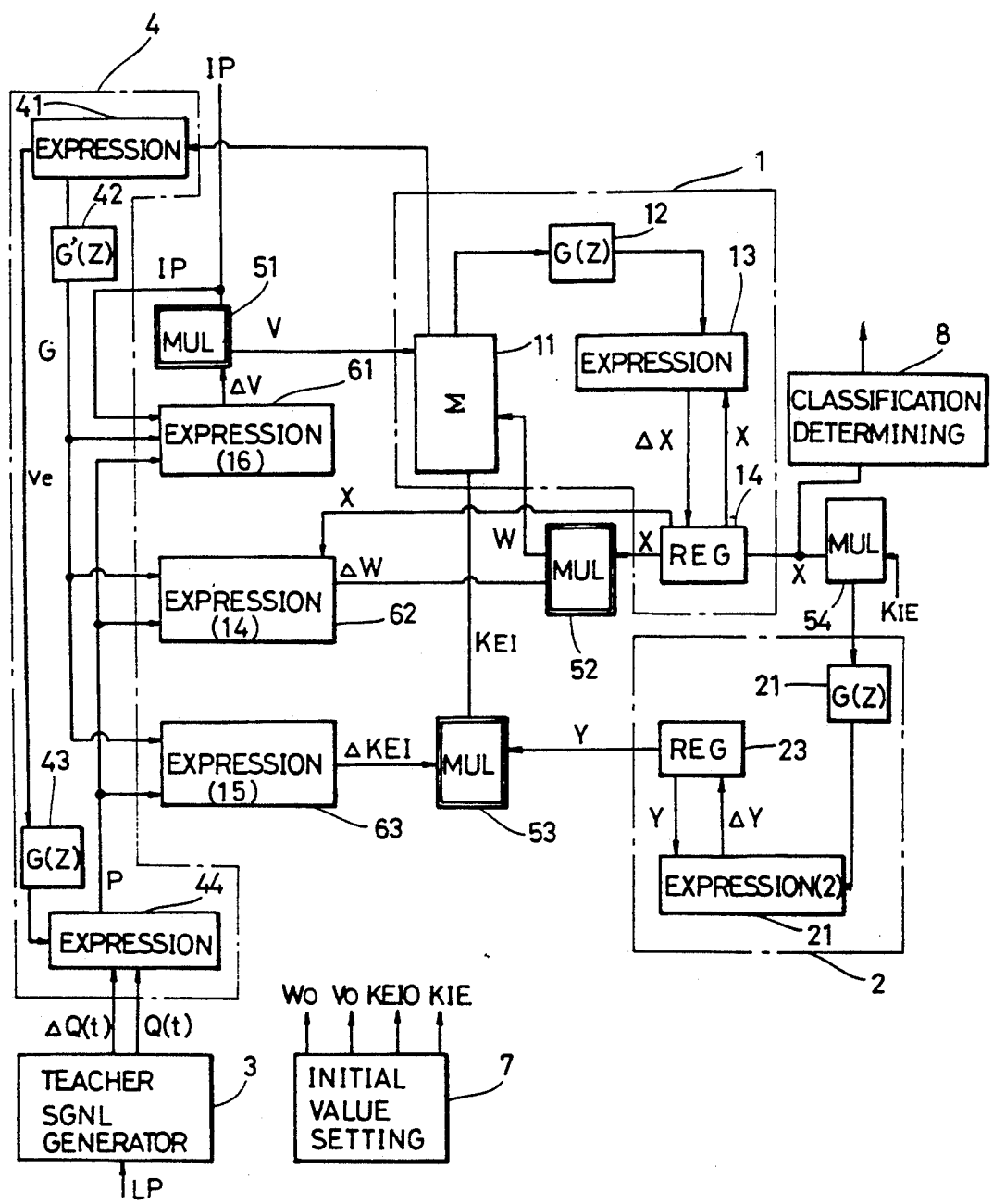
FIG. 1 is a block diagram of a processing unit shown in FIG. 2.

FIG. 1 is a block diagram of the processing unit in the pattern recognition apparatus shown in FIG. 2. With reference to FIG. 1, the processing unit includes an excitatory element circuit 1 and an inhibitory element circuit 2 both constituting a neural net, a teacher signal generator 3 for generating a teacher signal for making the neural net learn, a coupling coefficient controller 4 responsive to a teacher signal for controlling coupling coefficients in the neural net (or executing a learning processing), multipliers 51, 52 and 53 for multiplying coupling weight coefficients updated by learning, and coupling coefficient updating units 61, 62 and 63 for gradually changing the coupling weight coefficients during the learning process.

Figure 4:
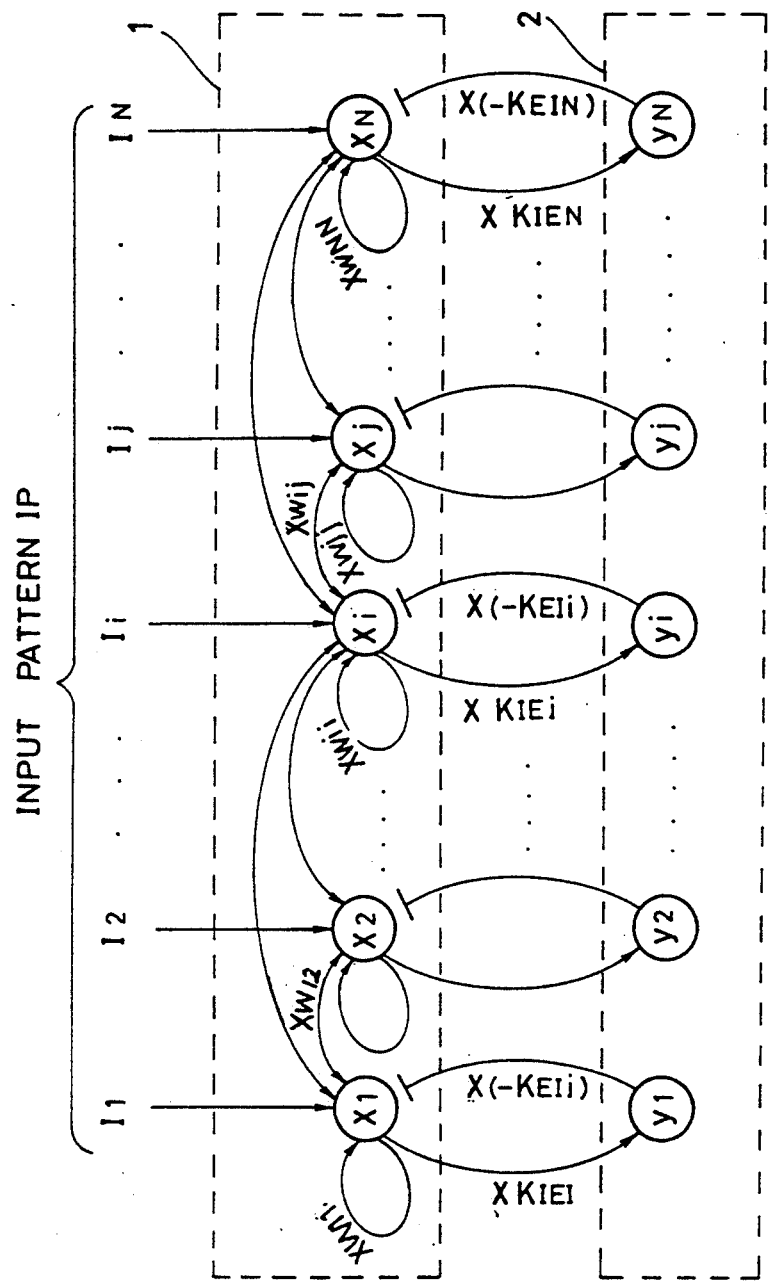
FIG. 4 is a circuit diagram of a neural net shown in FIG. 1.

FIG. 4 is a circuit diagram of a neural net constituted by excitatory element circuit 1 and inhibitory element circuit 2 shown in FIG. 1. With reference to FIG. 4, excitatory element circuit 1 includes N excitatory elements x1 to $x_N$. Excitatory elements x1 to $x_N$ receive N element signals I1 to $I_N$ included in input pattern IP, respectively. As element signals I1 to $I_N$ of the input pattern in character recognition, mesh density feature signals, direction contributivity density feature signals or the like for defining respective characters are used. The mesh density feature signals each indicate density or luminance for each pixel or for each mesh in the case where a pattern to be recognized is displayed on a virtual image. Therefore, when the mesh density feature signals are provided as element signals I1 to $I_N$, N mesh density feature signals with respect to N pixels for formation of a single character are provided as input pattern IP.

On the other hand, the direction contributivity density feature signals indicate the direction of segments to which each of pixels forming a single character contributes. When direction contributivity density feature signals of four directions are provided as element signals I1 to $I_N$, N direction contributivity density feature signals with respect to N/4 pixels are provided as input pattern IP.

Any two of N excitatory elements x1 to $x_N$ shown in FIG. 4 are coupled with each other through an excitatory element coupling coefficient Wij. For example, an i-th excitatory element xi and a j-th excitatory element xj are coupled with each other through coupling coefficient Wij. Each of excitatory elements x1 to $x_N$ is coupled to itself through a self-coupling coefficient Wii. Inhibitory element circuit 2 includes N inhibitory elements y1 to $y_N$. Inhibitory elements y1 to $y_N$ are each coupled to their corresponding excitatory elements x1 to $x_N$ through two pair-coupling weight coefficients, e.g., an excitatory coefficient $K_{IEi}$ and an inhibitory coefficient ($-K_{EIi}$). As can be seen from FIG. 4, the neural net employed in the pattern recognition apparatus shown in FIG. 2 is specified as including mutually coupled N excitatory element-inhibitory element pairs.

With reference again to FIG. 1, excitatory element circuit 1 includes an adder 11, a processor 12 for carrying out a processing in accordance with a predetermined nonlinear function G (z), a difference state updating unit 13, and a register (REG) 14. Adder 11 receives element signals I1 to $I_N$ of input pattern IP multiplied by an input coupling weight coefficient V through multiplier 51. Nonlinear function processor 12 receives data added by adder 11 as an input variable z. Difference state updating unit 13 receives data output from processor 12.

Inhibitory element circuit 2 includes a nonlinear function processor 21, a difference state updating unit 21 and a register 23. An activation signal X output from excitatory element circuit 1 is multiplied by an excitatory coupling coefficient $K_{IEi}$ applied to multiplier 54. The multiplied data is applied as input variable z to nonlinear function processor 21. Output data from nonlinear function processor 21 is applied to difference state updating unit 21. Difference state updating unit 21 receives an old activation signal Y from register 23 to apply a signal ΔY for updating activation signal Y to register 23. Activation signal Y held by register 23 is multiplied by an inhibitory coupling coefficient $K_{EI}$ applied to multiplier 53. The multiplied signal is then applied to adder 11.

Accordingly, excitatory element circuit 1 and inhibitory element circuit 2 constitute the neural net represented by the following expressions (1) to (3).

$$\frac{dx_i}{dt} = -x_i + G\left(\sum_{j=1}^{N} W_{ij}x_i - K_{EIi}y_i + V_i I_i\right) \quad (1)$$

$$\frac{dy_i}{dt} = -y_i + G(K_{IEi}x_i) \quad (2)$$

$$G(z) = \frac{2}{\pi} \arctan \frac{z}{a} \quad (3)$$

In the above expressions, xi and yi denote respective activation value signals of an excitatory element and an inhibitory element, respectively; dxi/dt and dyi/dt denote time differential of respective activation value signals xi and yi; Wij denotes a coupling weight coefficient between any two excitatory elements; $-K_{EIi}$ and $K_{IEi}$ denote an inhibitory coupling coefficient and an excitatory coupling coefficient between the excitatory element and the inhibitory element, respectively; Ii denotes an element signal of input pattern IP; and Vi denotes an input coupling weight coefficient. Function G (z) represented by the expression (3) is shown as one example of a continuous saturation S-shaped function. Parameter a determines sharpness of function G (z).

Coupling coefficient controller 4 finally determines respective coupling weight coefficients W, $K_{EI}$ and V of the neural net by carrying out a learning processing which will be described in detail later. In the following discussion, a description of the pattern recognition processing, is made on the assumption that a learning processing has already been completed, in order to facilitate the description.

Figure 5:
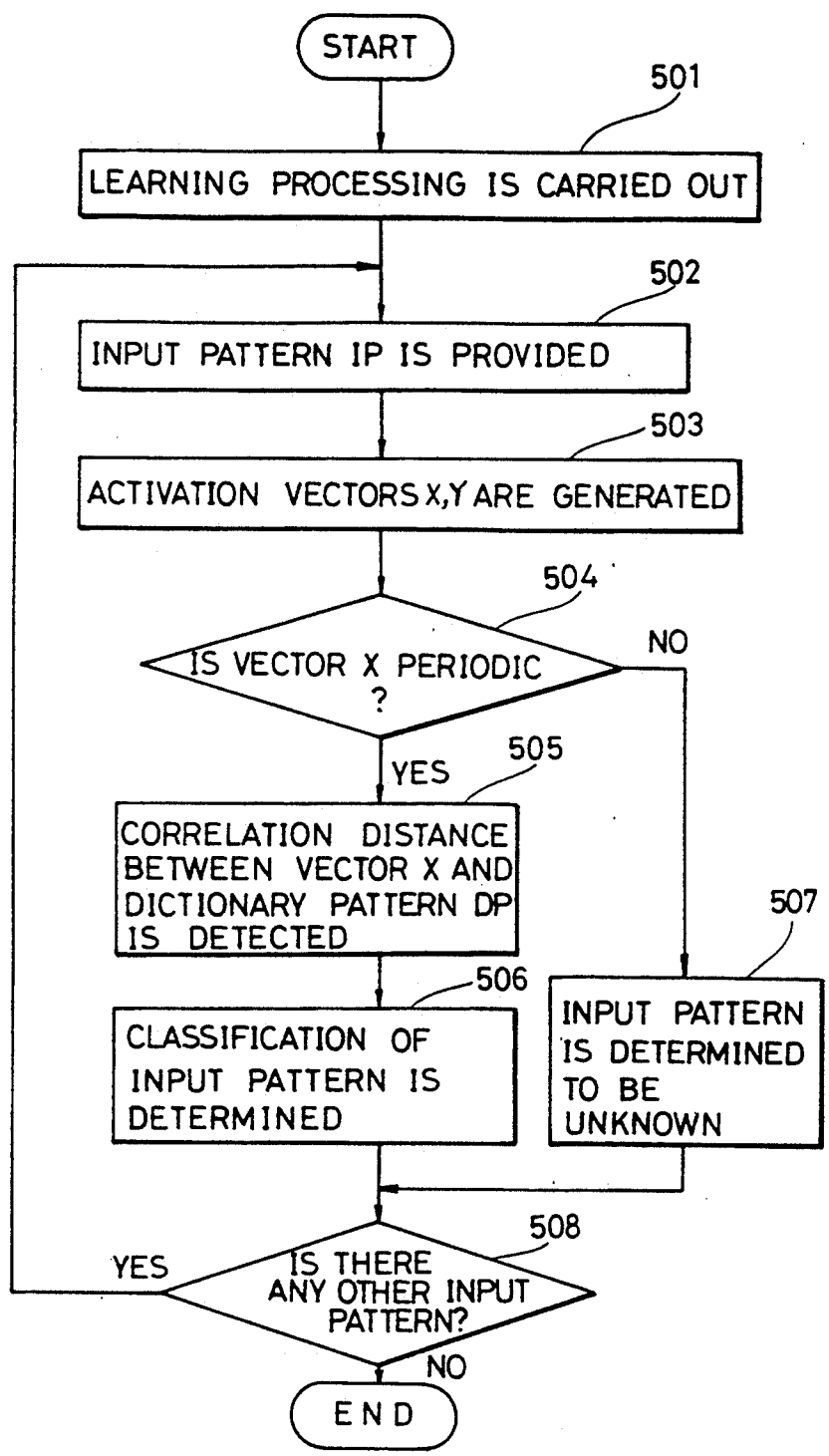
FIG. 5 is a flow chart of a pattern recognition processing in the processing unit shown in FIG. 2.

FIG. 5 is a flow chart showing a pattern recognition processing. With reference to FIG. 5, learning processing is first carried out by using teacher signal generator 3, coupling coefficient controller 4 and the like in step 501. After the learning processing is completed, an input pattern IP to be recognized is applied to multiplier 51 shown in FIG. 1 in step 502. Each of element signals I1 to $I_N$ of input pattern IP is multiplied by input coupling weight coefficient V provided to the multiplier, so that the multiplied signal is applied to adder 11 in excitatory element circuit 1.

Activation vectors X and Y are generated based on the expressions (1) to (3) in step 503. Activation vector X includes activation value signals x1 to $x_N$ which are output from N excitatory elements x1 to $x_N$ shown in FIG. 4. Similarly, activation vector Y includes nonactivation value signals y1 to $y_N$ which are output from N inhibitory elements y1 to $y_N$ shown in FIG. 4.

Therefore, difference state updating unit 13 generates time differential dxi/dt of activation value signal xi in accordance with the expression (1) to apply data ΔX for updating an old activation vector X held in register 14 to register 14. Similarly, difference state updating unit 21 generates time differential dyi/dt of activation value signal yi in accordance with the expression (2) and applies data ΔY for updating an old activation vector Y held in register 23 to register 23. As a result, updated activation vectors X and Y are obtained in registers 14 and 23, respectively.

The classification of applied input pattern IP is determined in steps 504 to 507. A processing for determining the classification is carried out in a processor 8. A determination is first made as to whether activation vector X changes periodically or not, in step 504.

Figure 6:
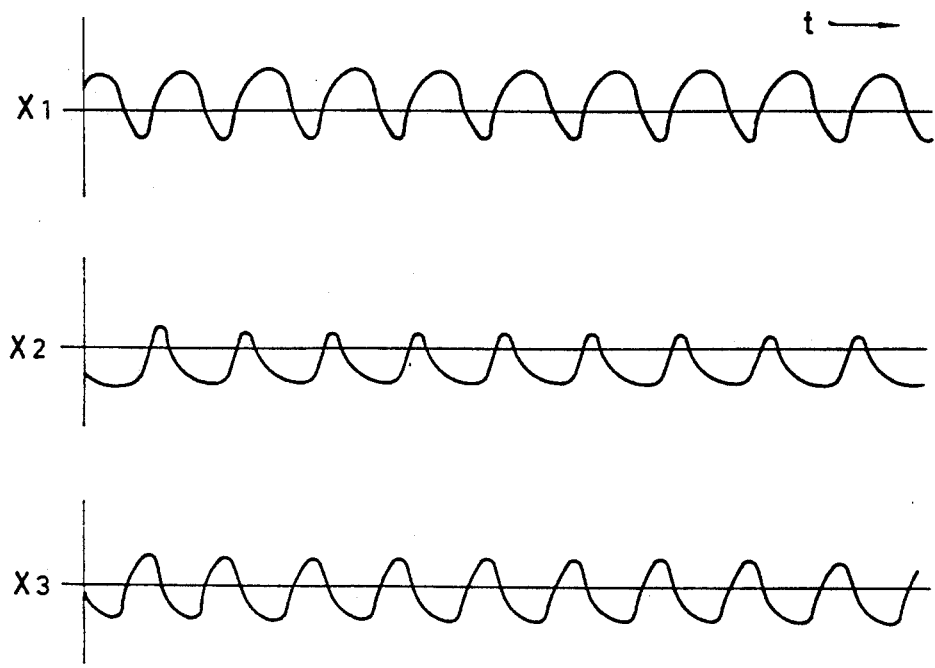
FIG. 6 is a waveform diagram showing an example of activation value signals constituting activation vectors.

FIG. 6 is a waveform diagram showing an example of activation value signals constituting activation vector X. Referring to FIG. 6, the lateral axis indicates an elapse of time t, and the longitudinal axis indicates the level of each of the activation value signals. Although only three activation value signals x1, x2 and x3 are shown in the example shown in FIG. 6, N activation value signals x1 to $x_N$ exist in practice. Since all of activation value signals x1, x2 and x3 shown in FIG. 6 have periodically changing waveforms, activation vector X comprising these signals as constituent elements is determined to be periodic.

Figure 8:
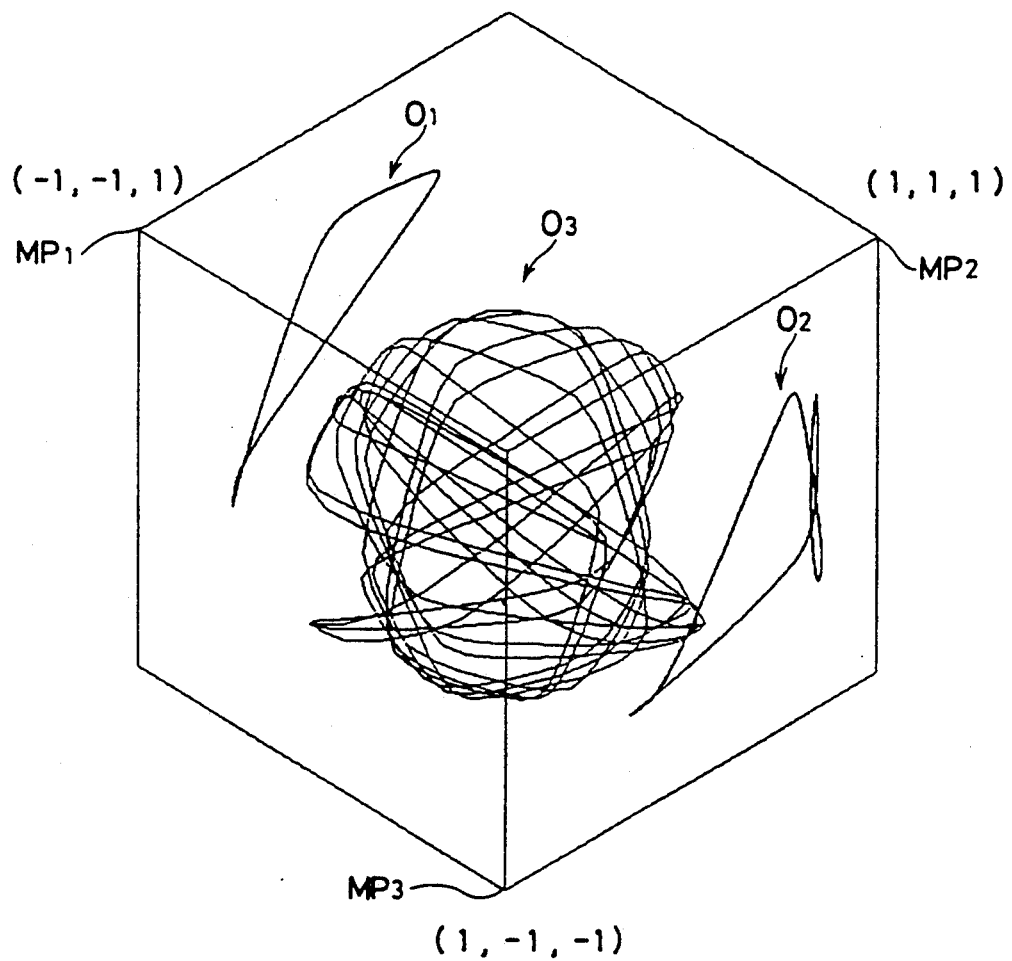
FIG. 8 is a vector orbit diagram for use in explaining periodicity of activation vectors.

FIG. 8 is a vector orbit diagram for use in explaining periodicity of activation vectors. In FIG. 8, two orbits $O_1$ and $O_2$ both having periodicity and an orbit $O_3$ having no periodicity are shown as an example. In the example shown in FIG. 8, orbits $)_1$, $O_2$ and $O_3$ include three activation value signals as elements. Thus, these vectors are represented in a three-dimensional space. Orbit $O_1$ plots a periodical orbit near a memory point MP1. Orbit $O_2$ plots a periodical orbit near a memory point MP2. On the contrary, orbit $O_3$ is chaotic and does not exist near any memory points. In other words, orbit $O_3$ has a chaotic orbit. It is pointed out that memory points MP1, MP2 and MP3 shown in FIG. 8 correspond to three learning patterns for use in a pattern learning which will be described later.

When it is determined in step 504 that activation vector X is periodical (e.g., orbits $O_1$ and $O_2$ shown in FIG. 8), a correlation distance between activation vector X and a dictionary pattern DP which is prepared in advance is detected in step 505. Dictionary pattern DP includes an average element signal (e.g., a binarized average pattern of a mesh density feature signal or a direction contributivity density feature signal) for each classification, i.e., for each character category in this embodiment. The following method is employed as one example for detecting the correlation distance.

If a correlation distance between a certain dictionary pattern, i.e., a certain character pattern $DP\mu$ and activation vector X is denoted with an overlap function $m\mu$ (t), and an element signal of dictionary pattern $DP\mu$ is denoted with a symbol $\epsilon^{82}{}_j$, correlation distance $m\mu$ (t) is expressed by the following equation.

$$m\mu(t) = \frac{1}{N} \sum_{j=1}^{N} \xi_j^\mu \cdot X_j(t) \quad (4)$$

Figure 7:
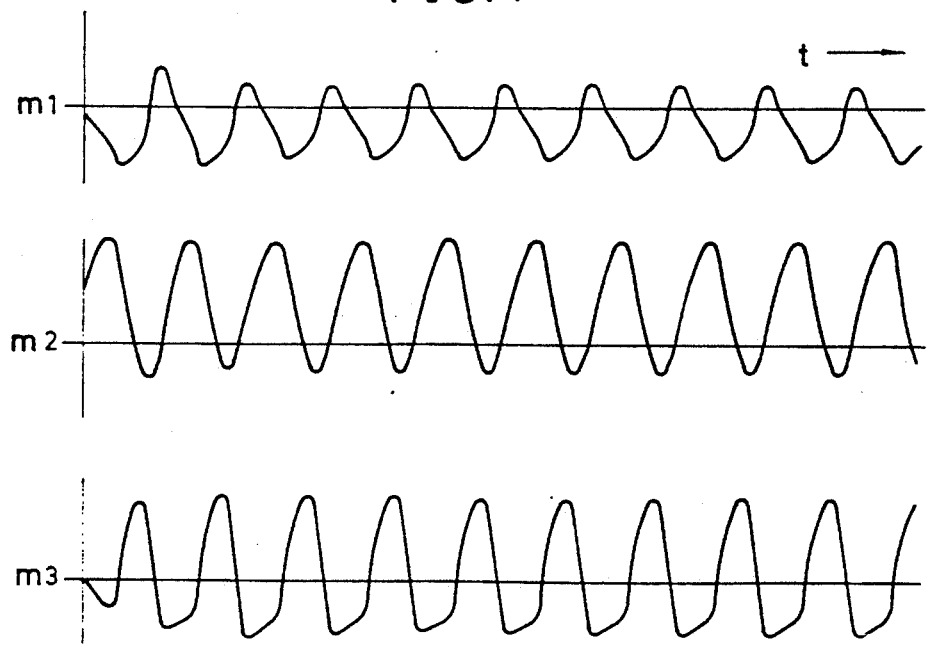
FIG. 7 is a waveform diagram showing an example of detected correlation distances.

FIG. 7 is a waveform diagram showing three examples of the detected correlation distance. Respective correlation distances m1, m2 and m3 indicate respective correlation distances between a certain activation vector X and respective dictionary patterns DP1, DP2 and DP3. It is found from FIG. 7 that since an amplitude of correlation distance m1 is smallest, the correlation distance between activation vector X and dictionary pattern DP1 is minimum, i.e., most distant from dictionary pattern DP1.

The classification of input pattern IP is determined in step 506. Since correlation distance $m\mu$ (t) has been detected in previous step 505, it is determined that the classification of applied input pattern IP is dictionary pattern $DP\mu$ with a long correlation distance.

A discrimination method employing $m\mu$ (t) obtained from the above expression (4), can be adopted such that a period is detected in which correlation distance $m\mu$ (t) provided in a predetermined time length Tf is larger than a certain threshold value (e.g., 0.75) and that a dictionary pattern in which a maximum period is detected is determined to be the result of discrimination. As another method, classification can be determined by comparing the levels of average values of correlation distance $m\mu$ (t).

When it is determined that activation vector X is not periodic in step 504, it is determined that input pattern IP is unknown in step 507.

A pattern recognition processing with respect to an applied single input pattern IP is terminated by the foregoing processing; however, when another input pattern is left, the foregoing processing is repeated. That is, when a processing for another input pattern is required in step 508, the processing returns to step 502.

Since the above description has been made on the pattern recognition processing, a detailed description will be made on a learning processing in the processing unit shown in FIG. 1.

Figure 3:
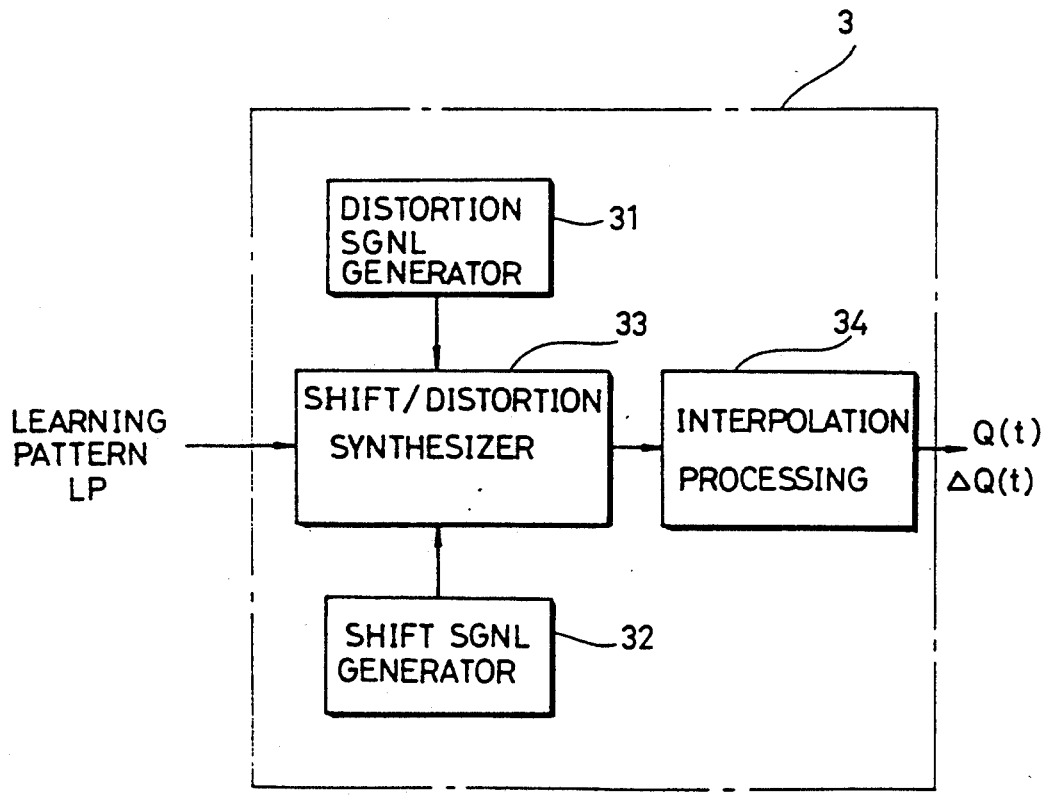
FIG. 3 is a block diagram of a teacher signal generator shown in FIG. 1.

FIG. 3 is a block diagram of teacher signal generator 3 shown in FIG. 1. With reference to FIG. 3, teacher signal generator 3 includes a distortion signal generator 31 for providing a distortion to a learning pattern LP placed on a virtual image, a shift signal generator 32 for providing a shift to learning pattern LP on the virtual image, a shift/distortion synthesizer 33 responsive to a distortion signal and a shift signal for transforming the applied learning pattern LP, and an interpolation processing unit 34 for carrying out an interpolation processing on a time base. A description will first be made on a method of causing distortion and shift in the applied learning pattern LP.

Figure 10:
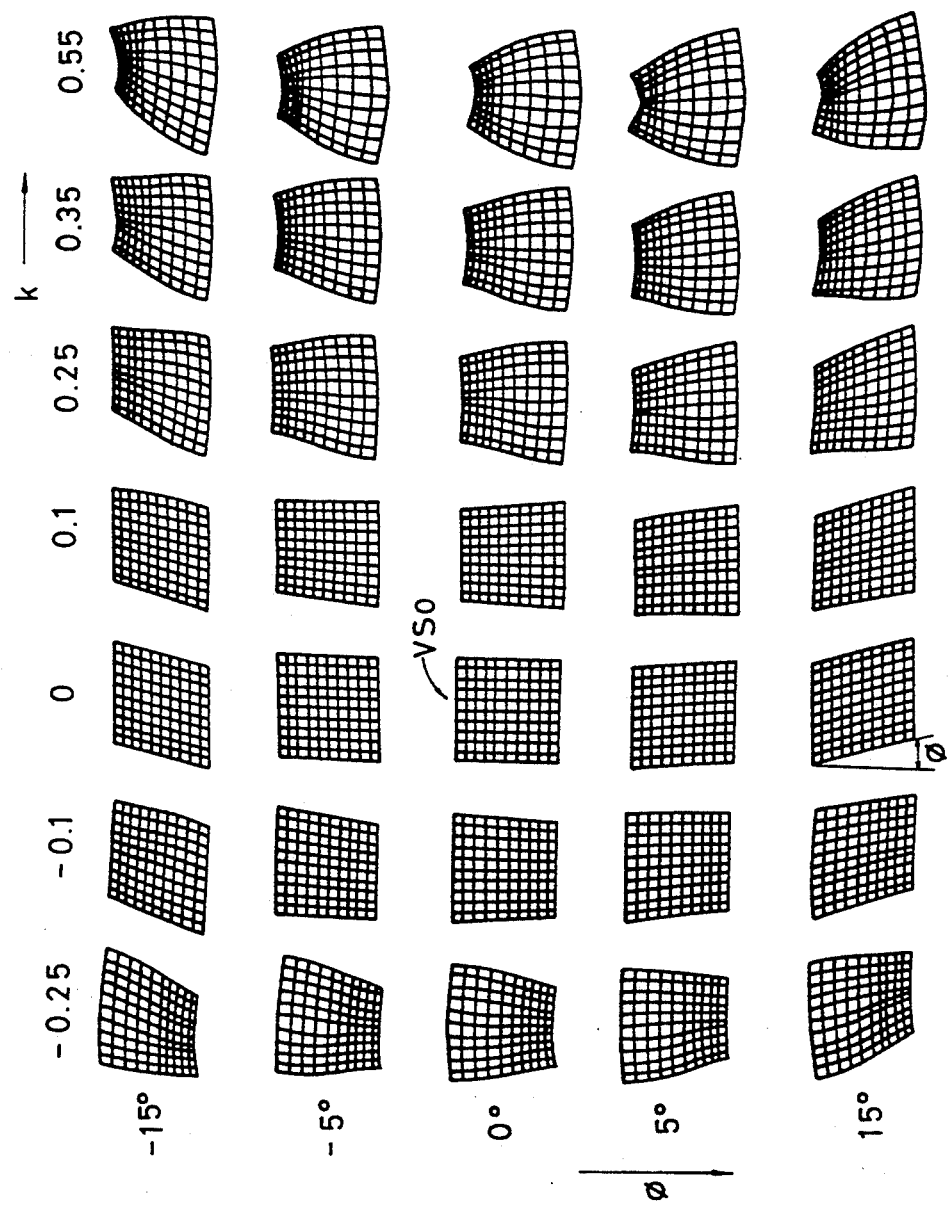
FIG. 10 is a virtual image varying diagram showing variations of a virtual image which is shifted and distorted.

FIG. 10 is a virtual image varying diagram showing variations of a virtual image shifted and distorted. The variations of the virtual image shown in FIG. 10 are defined by two parameters $\phi$ and k. $\phi$ represents an angle made by the shift of the virtual image, and k represents the degree of distortion shown by the following equations in polar coordinates (r, $\theta$).

$$r' = r(1 - k \sin \theta) \quad (5)$$

$$\theta' = \theta \quad (6)$$

Accordingly, with a virtual image $VS_o$ to be a reference set in the original form, gradually varying virtual images shown in FIG. 10 are obtained by gradually varying two parameters $\phi$ and k.

Figure 11:
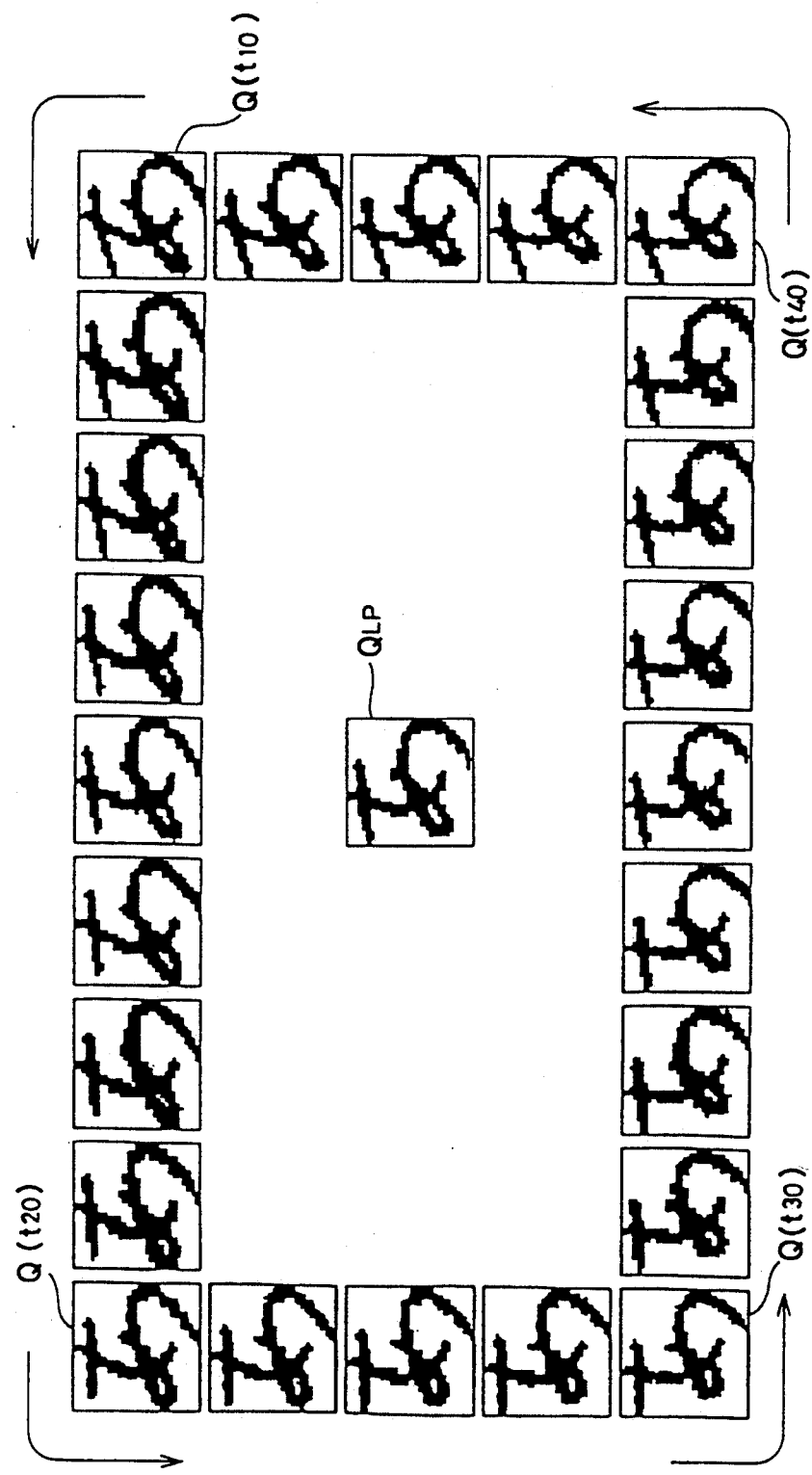
FIG. 11 is a transformation pattern diagram of a transformation pattern that changes periodically and is used as a teacher signal.

FIG. 11 is a transformed-pattern diagram of the transformed pattern that is employed as a teacher signal and varies periodically. An example shown in FIG. 11 indicates the case where a Japanese character (so-called "Hiragana") "あ" is provided as learning pattern LP to be a reference. That is, a reference pattern $Q_{LP}$ shown in FIG. 11 is provided as a learning pattern.

By transforming the virtual image having reference pattern $Q_{LP}$ placed thereon, as shown in FIG. 10, a teacher signal Q (t) indicating the transformed pattern shown in FIG. 11 is obtained. With reference to FIG. 11, when $\phi$ is $-10°$ and k is 0.4, a teacher signal Q (t10) is obtained at time t10. When $\phi$ is 10° and k is $-0.4$, a teacher signal Q (t20) is obtained at time t20. When $\phi$ is 10° and k is $-0.4$, a teacher signal Q (t30) is obtained at time t30. When $\phi$ is 10° and k is 0.4, a teacher signal Q (t40) is obtained at time t40. As shown in FIG. 11, teacher signal Q (t) is initially a discrete signal; however, a successive teacher signal Q (t) is obtained by an interpolation processing on time base in interpolation processing unit 34 shown in FIG. 3. Interpolation processing unit 34 carries out the interpolation processing by utilizing a linear interpolation, a spline interpolation or the like between adjacent discrete patterns. Generated successive teacher signal Q (t) and its infinitesimal change $\Delta Q(t)$ are applied to coupling coefficient controller 4 shown in FIG. 1.

Figure 9:
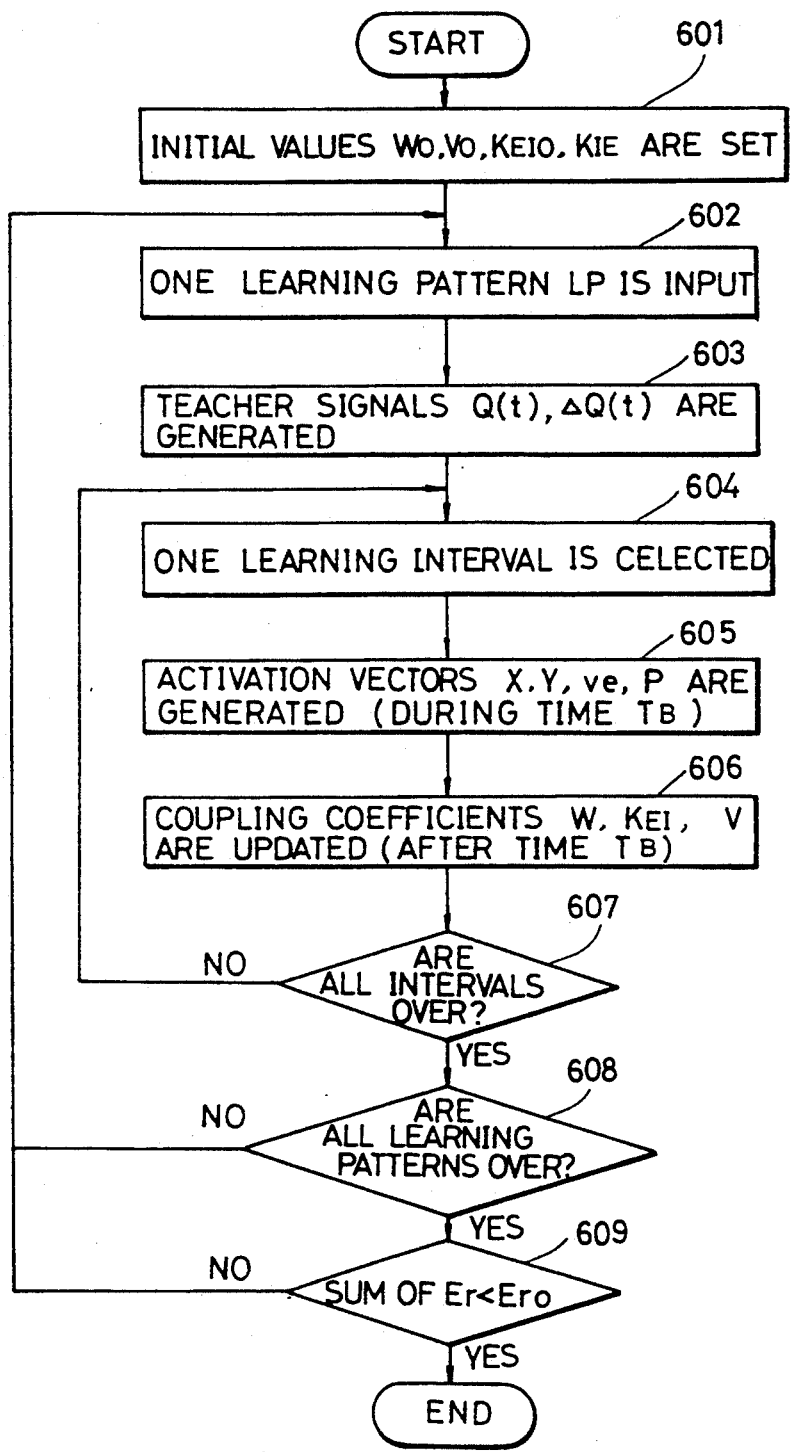
FIG. 9 is a flow chart of a learning processing in the processing unit shown in FIG. 1.

FIG. 9 is a flow chart of a learning processing in the processing unit shown in FIG. 1. A description will now be made on the learning processing with reference to FIGS. 1 and 9.

First, initial coupling coefficients $W_o$, $V_o$, $K_{EIO}$ and $K_{JE}$ are set in step 601. These initial coupling coefficients are applied from an initial value setting processor 7 shown in FIG. 1. In this embodiment, it is pointed out that an excitatory coupling coefficient $K_{JE}$ is kept constant in the following processing. Also, an initial value $W_{ij}$ of the excitatory element coupling coefficient is determined by the following expression:

$$W_{ij} = \frac{1}{N} \sum_{\alpha=1}^{M} \xi_i^\alpha \cdot \xi_j^\alpha \qquad (7)$$

where $\epsilon^\alpha_i$ is each dictionary pattern of M categories, i.e., a memory pattern to be a prototype of each of characters, and an average pattern in each category is represented by using two binary values of $+1$ and $-1$.

Necessary conditions for oscillation in the neural net shown in FIG. 1 can be obtained analytically. That is, in order to make memory point MP unstable and cause an oscillation, oscillation conditions $Wii \geq \pi \cdot a$ and $K_{EI} > Wii \cdot \pi \cdot x^*$ are required. In this embodiment, relations $a = 0.1$, $K_{JE} = K_{EI} = 2.0$, $Vi = 1.0$ are initially set as one example. In the above oscillation conditions, $x^*$ is the equilibrium point value (0.6212 when $Wii = 1$ is satisfied) causing an oscillation (Hopf bifurcation). If $Wii < 0.3$ is satisfied in the case of a $= 0.1$, such necessary conditions are not satisfied. Thus, in such a case, a value 1.0 is added to a diagonal element $Wii$ in the expression (7), whereby the necessary conditions are satisfied.

In step 602, a single learning pattern LP is applied to teacher signal generator 3, so that teacher signal generator 3 outputs a successive teacher signal $Q(t)$ and its infinitesimal change $\Delta Q(t)$, as described above.

A processing shown in the following expressions is carried out in coupling coefficient controller 4 shown in FIG. 1.

$$v_i(t) = K_{EIi} x_i(t) \qquad (8)$$

$$R_i(T + T_B) = 0 \qquad (9)$$

$$\frac{dR_i(t)}{dt} = R_i(t) - R_i(t)G'(v_i(t))K_{JEi} \qquad (10)$$

$$\Delta K_{JEi} = -\eta \int_T^{T+T_B} [R_i(t)G'(v_i(t))x_i(t)]dt \qquad (11)$$

$$ve_i(t) = \sum_{j=1}^{N} W_{ij}x_j - K_{EIi}y_i + V_i I_i \qquad (12)$$

$$P_i(t) = -Q_i'(t) - Q_i(t) + G(ve_i) \qquad (13)$$

$$\Delta W_{ij} = -\eta \int_T^{T+T_B} [P_i(t)G_i'(ve_i(t))x_j(t)]dt \qquad (14)$$

$$\Delta K_{EIi} = -\eta \int_T^{T+T_B} [P_i(t)G_i'(ve_i(t))y_i(t)]dt \qquad (15)$$

$$\Delta V_i = -\eta \int_T^{T+T_B} [P_i(t)G_i'(ve_i(t))[i]dt \qquad (16)$$

$$G'(z) = \frac{2a}{\pi(a^2 + z^2)} \qquad (17)$$

Coupling coefficient controller 4 shown in FIG. 1 includes an arithmetic unit 41 for executing an arithmetic operation represented by the expression (12), an arithmetic unit 42 for executing an arithmetic operation represented by the expression (17), a nonlinear function processor 43 and an arithmetic unit 44 for executing an arithmetic operation represented by the expression (13).

In the above expressions, T is a present time, $T_B$ is a time length in a single learning interval, $\eta$ is a learning coefficient for determining a step width of learning, $Q'(t)$ is a time differential of a teacher signal, and $G'(z)$ is a derivative of a function $G(z)$ and expressed by the expression (17).

A single learning interval is selected in step 604. In such a learning processing, an interval that is determined by two patterns employed for outputting successive teacher signal $Q(t)$, (i.e., employed in the interpolation processing) is handled as a single learning interval. Accordingly, learning of one cycle of continuous transformation indicated by teacher signal $Q(t)$ is represented by a series of those learning intervals.

Figure 12:
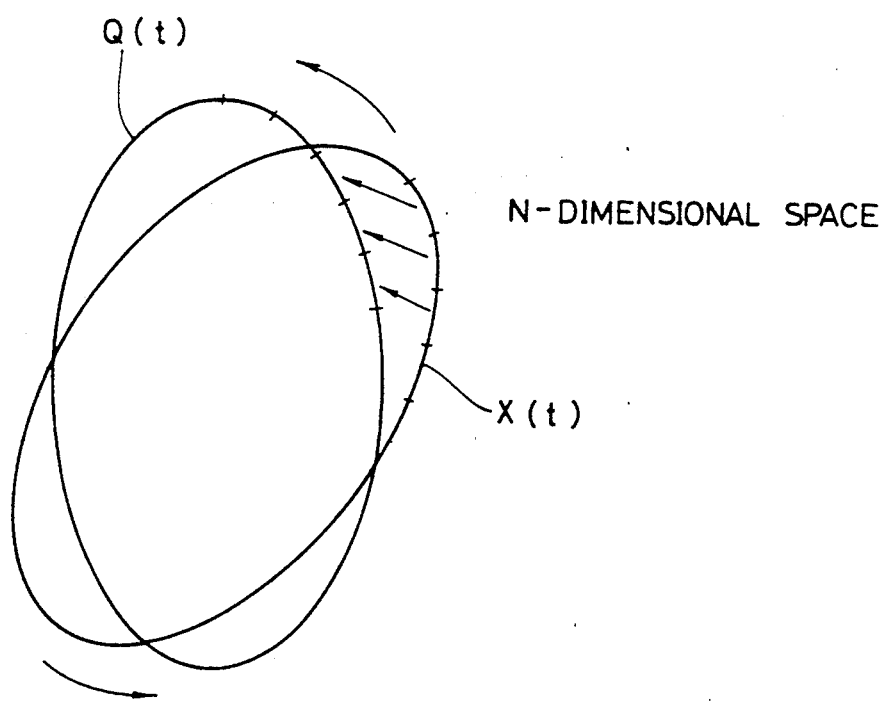
FIG. 12 is a schematic diagram showing proceedings of a learning processing.

FIG. 12 is a schematic diagram showing proceedings of the learning processing. FIG. 12 shows an N-dimensional space, and a teacher signal $Q(t)$ and an activation vector $X(t)$ are present in the N-dimensional space. Referring to FIG. 12, a corresponding learning interval between a teacher signal pattern $Q(z)$ and activation vector $X(t)$ is shown. Therefore, a learning processing is carried out for each input pattern, with one cycle of the teacher signal pattern divided into several learning intervals. The pattern indicated by teacher signal $Q(t)$ is fixed in the N-dimensional space. As learning of the neural net proceeds, activation vector $X(t)$ output from the neural net approaches in the direction of the teacher signal pattern. That is, since each coupling weight coefficient is gradually changed with respect to each corresponding learning interval, the neural net grows by learning.

When the neural net having such a feedback coupling as shown in the embodiment is processed on the basis of conventional learning rules, a processing that proceeds backward on time base is necessary in order to carry out a learning of coupling weight coefficients in which a signal is transmitted to an element which is not provided with a teacher signal. In the embodiment of the present invention, such a processing corresponds to a learning with respect to excitatory coupling coefficient $K_{JE}$ for providing a signal to an inhibitory element which is not provided with a teacher signal in the neural net shown in FIG. 4. The above-described processing is thus carried out.

In the embodiment of the present invention, however, since excitatory coupling weight coefficient $K_{JE}$ in the learning processing is fixed, the backward processing on a time base is unnecessary. That is, an efficient learning processing can be executed only by a forward processing on a time base. Thus, after activation vectors X and Y, ve and P are generated (during time $T_B$) in step 605, coupling coefficients W, $K_{EI}$ and V are updated in step 606.

A determination is made as to whether the processing is terminated with respect to all learning intervals in step 607. If some learning interval is left, the processing returns to step 604.

After the processing in all the learning intervals is terminated, a determination is made as to whether the processing is terminated with respect to all learning patterns in step 608. If some learning pattern is left, the processing returns to step 602.

After the processing is terminated with respect to all the learning patterns, each error Er is obtained for learning patterns by the following expression.

$$Er = \frac{1}{2} \int_{T}^{T+T_B} \sum_{i=1}^{N} \{-P_i(t)\}^2 dt \quad (18)$$

The processings in step 602–608 are repeated until a sum in one cycle of detected error Er becomes smaller than the required error Ero. Consequently, the learning processing is completed.

Figure 13:
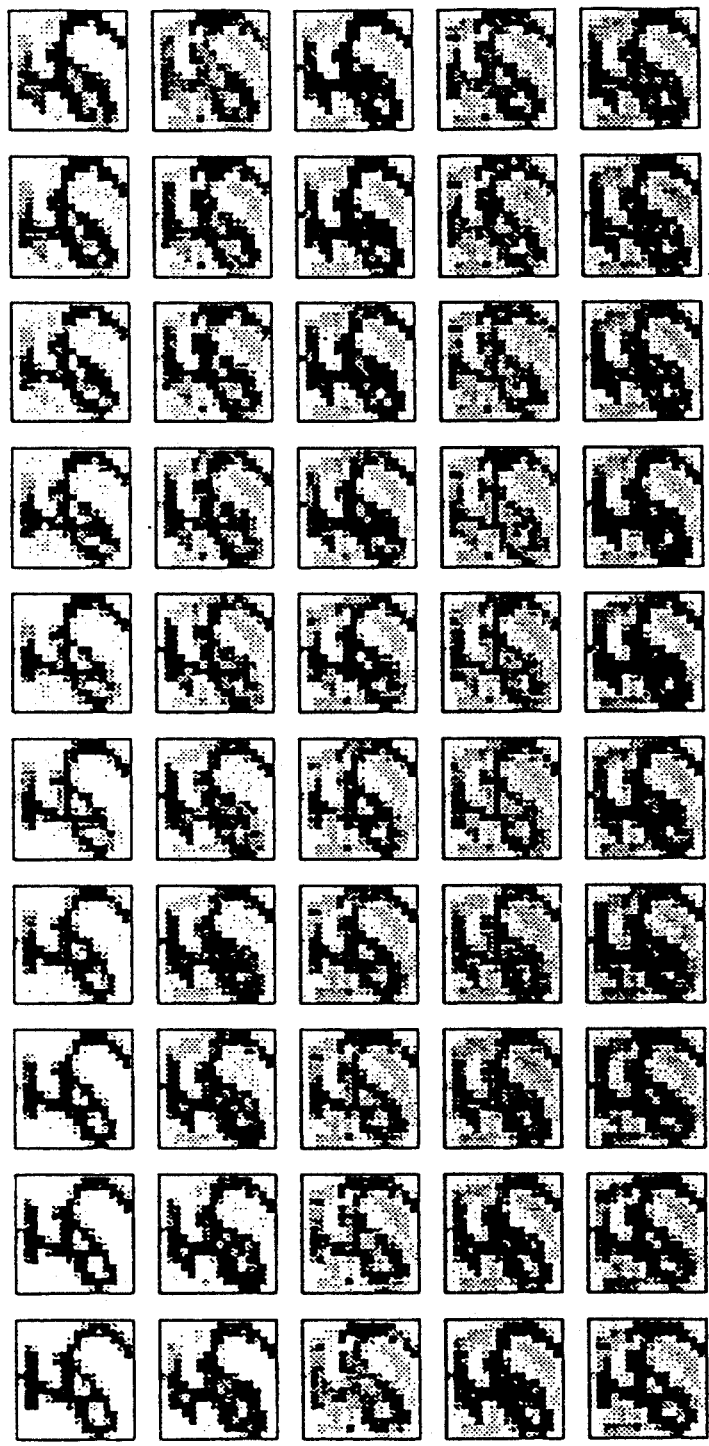
FIG. 13 is an activation vector varying diagram showing variations of activation vectors output from a neural net before learning.
Figure 14:
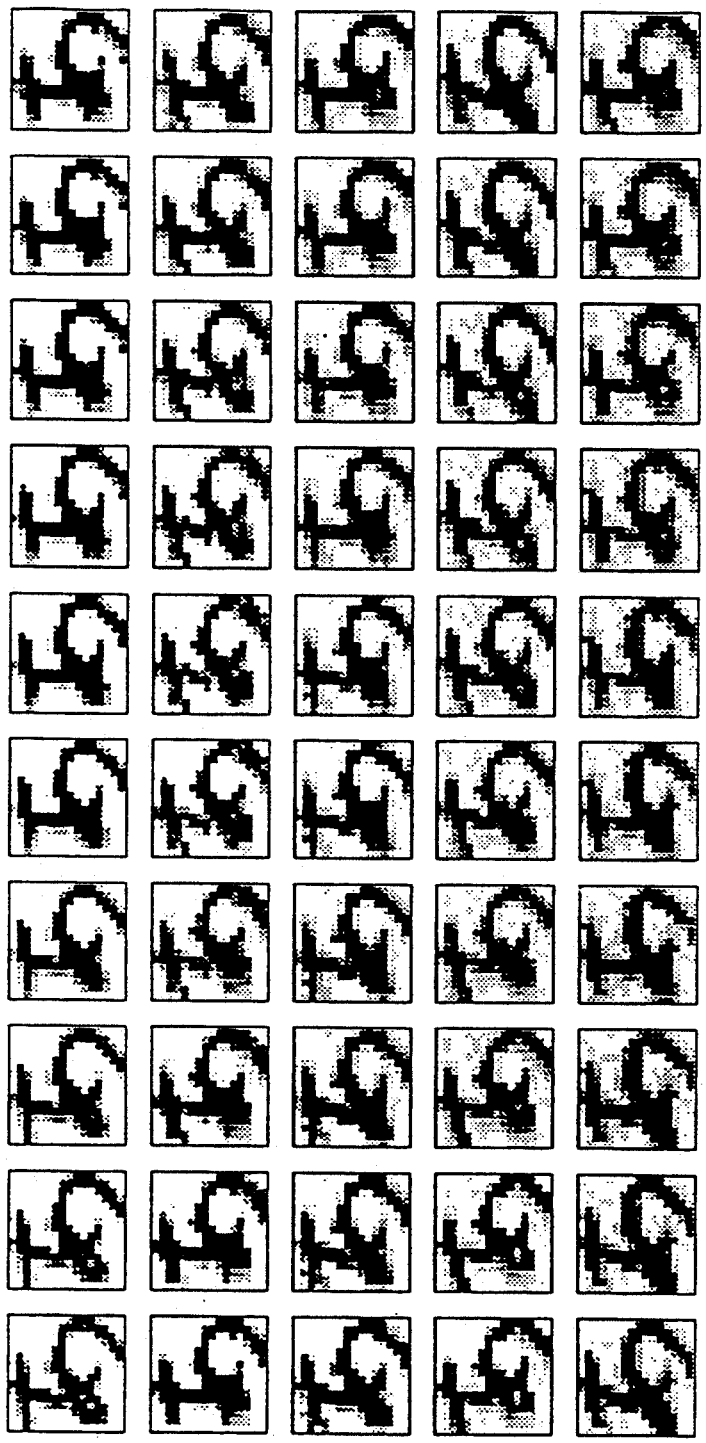
FIG. 14 is an activation vector varying diagram showing variations of activation vectors output from the neural net after learning.

FIG. 13 is the activation vector varying diagram showing one example of variations of an activation vector output from the neural net prior to learning. FIG. 14 is the activation vector varying diagram showing variations of an activation vector output from the neural net after learning. In FIGS. 13 and 14, time elapses from a first row to a fifth row and rightward. As can be seen from a comparison between FIGS. 13 and 14, it is pointed out that after the learning, the activation vector has a more definite periodicity indicating the same continuous transformation as that of a teacher signal.

Figure 15:
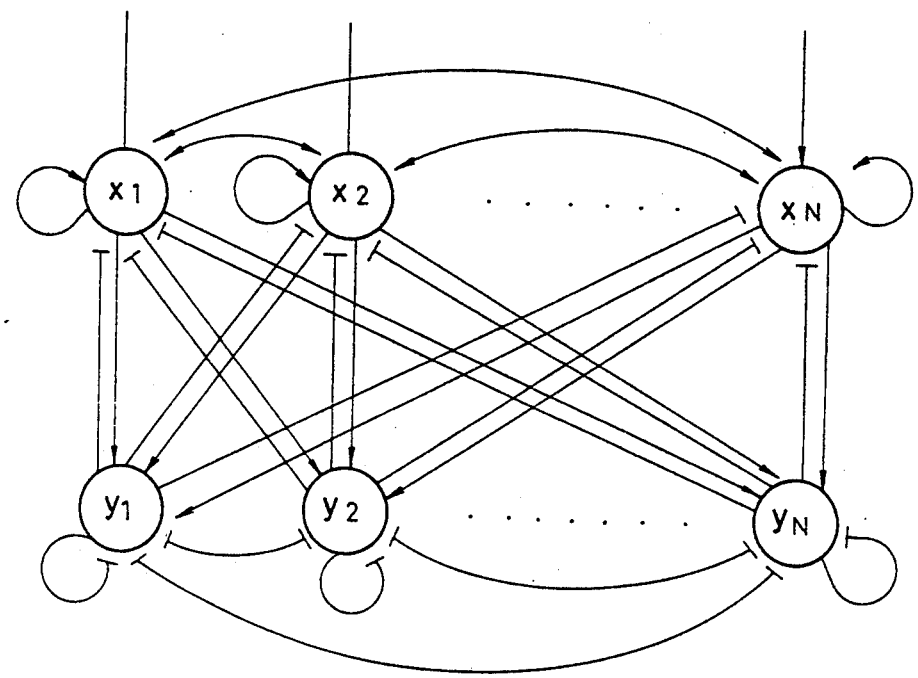
FIG. 15 is a circuit diagram showing another example of a neural net to which the present invention is applicable.
Figure 16:
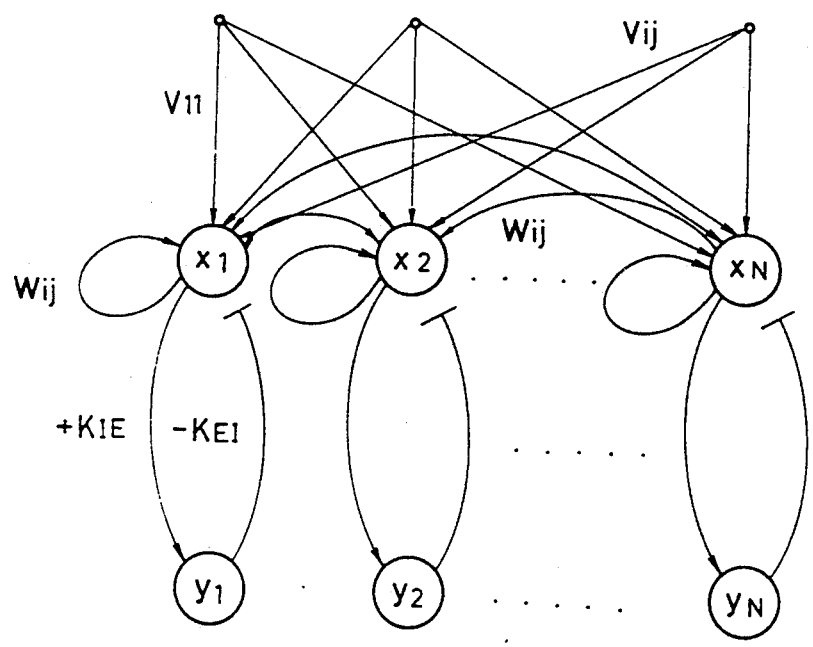
FIG. 16 is a circuit diagram showing still another example of a neural net to which the present invention is applicable.

While the foregoing description has been made on the case where the present invention is applied to the neural net shown in FIG. 4 in the foregoing embodiment, it is pointed out that the present invention is also applicable to the neural net shown in FIG. 15 or 16.

As has been described heretofore, according to the present invention, since a continuous transformation operation that is considered to be used in the recognition process by human beings can be obtained by learning, a capability that is closer to the pattern recognition by human beings as compared with a conventional pattern recognition method can be expected. In addition, as has been already pointed out, since a backward processing on a time base according to learning rules of a recurrent net is unnecessary, such an advantage is also obtained that an efficient learning of a continuously transformed pattern is available.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pattern recognition apparatus for recognizing an applied input pattern, said input pattern including a plurality of input signals for defining said input pattern, said apparatus comprising:
   a neural net including a plurality of excitatory element-inhibitory element pairs which are mutually coupled with each other in accordance with a predetermined relation,
   each said element pair having a corresponding excitatory element and a corresponding inhibitory element coupled in opposite directions through a first pair coupling coefficient for the excitatory coupling and a second pair coupling coefficient for the inhibitory coupling, respectively,
   said plurality of excitatory elements each receiving said plurality of input signals,
   any two of said plurality of excitatory elements being coupled in opposite directions through excitatory element coupling coefficients;
   teacher signal generating means for generating a teacher signal in accordance with a learning pattern to be learned;
   coupling coefficient updating means responsive to a teacher signal for updating said first and second pair coupling coefficients and said excitatory element coupling coefficients in said neural net,
   after updating by said coupling coefficient updating means, said neural net receiving said plurality of input signals and outputting an activation signal through said plurality of excitatory elements; and
   classification determining means responsive to said activation signal for determining classification of said input pattern.

2. The pattern recognition apparatus according to claim 1, wherein
   said teacher signal generating means includes learning pattern changing means for generating said teacher signal by continuously changing said learning pattern on the basis of a predetermined rule.

3. The pattern recognition apparatus according to claim 2, wherein
   said learning pattern includes a learning image pattern placed on a two-dimensional virtual image, and
   said learning pattern changing means includes,
   image skewing means for skewing said virtual image in a predetermined ratio, and
   image distortion means for distorting said virtual image based on a predetermined expression, wherein
   said learning image pattern is varied in accordance with said virtual image changed by said image skewing means and said image distortion means.

4. The pattern recognition apparatus according to claim 3, wherein
   said learning pattern is varied discretely, and
   said learning pattern changing means further includes continuous conversion means for converting said learning image pattern into a continuously time-sequential signal.

5. The pattern recognition apparatus according to claim 1, wherein
   said classification determining means includes periodicity determining means for determining whether the activation signal output from said neural net has periodicity or not, and
   the classification of said input pattern is determined in response to said periodicity determining means.

6. The pattern recognition apparatus according to claim 5, wherein
   said classification determining means further includes correlation distance detecting means for detecting a correlation distance between said activation signal and a predetermined dictionary pattern when said periodicity determining means determines the periodicity of the activation signal, and
   the classification of said input pattern is determined in response to said correlation distance detecting means.

7. The pattern recognition apparatus according to claim 1, wherein said neural net further includes, a plurality of first multipliers for multiplying an output signal of corresponding one of said excitatory elements by corresponding one of said first pair coupling coefficients and applying the multiplied signal to corresponding one of said inhibitory elements, a plurality of second multipliers for multiplying an output signal of corresponding one of said inhibitory elements by corresponding one of said second pair coupling coefficients and applying the multiplied signal to corresponding one of said excitatory elements, and a plurality of third multipliers for multiplying respective output signals of any two of said plurality of excitatory elements by corresponding ones of said excitatory element coupling coefficients, respectively, and applying one multiplied signal and the other multiplied signal to the other and one of said two output signals, respectively.

8. The pattern recognition apparatus according to claim 3, wherein said learning image pattern comprises a plurality of learning character patterns each indicating different characters, and said classification determining means includes character selecting means responsive to said activation signal for selecting the classification of said input pattern from said plurality of learning character patterns.

9. The pattern recognition apparatus according to claim 1, wherein said plurality of input signals for defining said input pattern comprise a plurality of mesh density feature signals for defining a provided two-dimensional image.

10. The pattern recognition apparatus according to claim 7, wherein said neural net further includes a plurality of fourth multipliers for multiplying corresponding one of said input signals by a corresponding input coupling coefficient and applying the multiplied signal to corresponding one of said excitatory elements, and said coupling coefficient updating means further updates the input coupling coefficient in said neural net.

11. The pattern recognition apparatus according to claim 1, wherein said coupling coefficient updating means updates the second pair coupling coefficient and the excitatory element coupling coefficient in said neural net by carrying out only a forward processing on time base.

12. A pattern learning apparatus, comprising:

a neural net including a plurality of excitatory element-inhibitory element pairs which are mutually coupled with each other in accordance with a predetermined relation, each said element pair having corresponding one of said excitatory elements and corresponding one of said inhibitory elements coupled with each other in opposite directions through first and second pair coupling coefficients, any two of said plurality of excitatory elements being coupled in opposite directions through an excitatory element coupling coefficient;

teacher signal generating means for generating a teacher signal in accordance with a learning pattern to be learned; and sequential-time learning processing means for updating said second pair coupling coefficient and said excitatory element coupling coefficient in said neural net by carrying out only a forward processing on a time base with respect to the teacher signal.

13. The pattern recognition apparatus according to claim 1, wherein said plurality of input signals for defining said input pattern comprise a plurality of direction contributivity density feature signals for defining a provided two-dimension image.

14. A pattern recognition apparatus for recognizing an applied input pattern, said input pattern including a plurality of input signals for defining said input pattern, said apparatus comprising:

a neural net including a plurality of excitatory element-inhibitory elements pairs which are mutually coupled through with each other in accordance with a predetermined relation, each of said element pair having a corresponding excitatory element and a corresponding inhibitory element coupled in opposite directions through a first pair coupling coefficient for the excitatory coupling and a second pair coupling coefficient for the inhibitory coupling, respectively, said plurality of excitatory elements each receiving said plurality of input signals, any two of said plurality of excitatory elements being coupled in opposite directions through excitatory element coupling coefficients;

said neural net receiving said plurality of input signals and outputting an activation signal through said plurality of excitatory elements; and classification determining means responsive to said activation signal for determining classification of said input pattern.

* * * * *